United States Patent [19]

Rademachers

[11] 4,071,480

[45] Jan. 31, 1978

[54] HARDENER FOR PRODUCTION SOLID FOAMS OR COMPACT STRUCTURE FROM AQUEOUS SOLUTIONS

[75] Inventor: Jakob Rademachers, Krefeld, Germany

[73] Assignee: Bayer Aktiengesellschaft, Leverkusen, Germany

[21] Appl. No.: 463,640

[22] Filed: Apr. 23, 1974

[30] Foreign Application Priority Data

May 10, 1973 Germany .............................. 2323488

[51] Int. Cl.² .............................................. C08J 9/14
[52] U.S. Cl. ...................... 260/2.5 F; 106/74; 106/75; 260/29.4 R; 260/39 M; 260/39 R; 260/395 B; 260/69 F; 260/71; 260/2.5 B
[58] Field of Search ............. 260/2.5 F, 69 F, 71, 260/29.4 R; 106/74, 75

[56] References Cited

U.S. PATENT DOCUMENTS

| | | | |
|---|---|---|---|
| 3,178,299 | 4/1965 | Eppstein | 106/74 |
| 3,977,888 | 8/1976 | Sano et al. | 106/74 |

OTHER PUBLICATIONS

"Catalysts for Polymerization of Aldehydes", Fukui et al., Chem. Abstracts, vol. 60, p. 3124e.

*Primary Examiner*—Morton Foelak
*Attorney, Agent, or Firm*—Burgess, Dinklage & Sprung

[57] ABSTRACT

In the production of foams or compact materials by adding an acidic hardener to an aqueous system containing at least one of an organic and an inorganic component capable of being hardened thereby, the improvement which comprises employing boron phosphate as said hardener. Preferred components comprise urea-formaldehyde or thiourea-formaldehyde and/or an alkali metal silicate. A polyhydric alcohol such as glycerine and/or a gelling agent may also be included along with a foaming agent.

8 Claims, No Drawings

HARDENER FOR PRODUCTION SOLID FOAMS OR COMPACT STRUCTURE FROM AQUEOUS SOLUTIONS

This invention relates to a process for the production of foams or compact materials in which the organic and/or inorganic starting components present in aqueous starting systems are solidified. The invention is particularly concerned with starting systems in which solidification is initiated by the addition of certain substances which lower the pH-value of the aqueous starting system, as for example in the production of foams or compact materials on a silica or urea-formaldehyde basis. Solidifying agents of this kind are referred to hereinafter as hardeners. In cases where several hardeners are used in combination, reference is made to a hardener system.

There already exist several hardeners of this kind which, although working more or less satisfactorily in certain foam or compact-material systems, are unsuitable for use in other systems. The object of the invention is to develop a hardener which is able to harden different material systems both separately and also in admixture with one another by means of a polymerization or polycondensation reaction. In this way it is possible to obtain combinations of foam or compact materials which combine the favorable properties of the individual components, such as the fire resistance of the inorganic component and the low unit weight of the organic component.

The difficulty in finding a common hardener lies in the fact that different systems require different pH-ranges for solidification. For example, a urea-formaldehyde mixture is preferably hardened at a pH-value of from 4 to 6. Phosphoric acid is preferably used for this purpose.

By contrast, in producing a silica-based material from waterglass solution, the pH-value must be carefully reduced, a value below 10 being sufficient. Even in this case, adjustment of the pH-value with a strong acid, such as hydrochloric or sulfuric acid, does not produce the required result. After drying, the products obtained show no cohesion and disintegrate. The use of phosphoric acid also produces a powdery material.

In the production of monolithic silica-based materials from aqueous alkali metal silicate solutions, substances of this kind lead to materials of high cohesion and satisfactory strength enabling linkage of the $SiO_2$-members to be controlled by slow polymerization. Acids which are particularly suitable for this purpose include either weak acids, generally organic acids, or substances which gradually eliminate acid through hydrolysis in an after reaction. In this respect, chlorine-containing organic compounds and alkali salts of hexafluosilicic acid are already known. Weak inorganic acids, such as boric acid, give products of lower strength. By contrast, they are unable to initiate polycondensation in the urea-formaldehyde system.

Whereas, boric acid, although a suitable hardener for waterglass solutions, cannot be used for aqueous urea-formaldehyde mixtures, and phosphoric acid only works satisfactorily in the urea-formaldehyde system, a mixture of boric acid and phosphoric acid behaves in the same way as pure phosphoric acid and so can only be used for hardening urea-formaldehyde without affording any advantages.

The present invention relates to a process for the production of foams or compact materials by solidifying aqueous, optionally gelled systems containing inorganic and/or organic starting components, in which solidification is carried out in the presence of boron phosphate.

It has surprisingly been found that the reaction product of boric acid and phosphoric acid, namely boron phosphate, is able to work equally satisfactorily in systems on an organic, inorganic and organic-inorganic basis. Owing to slow hydrolysis, solidification of the silica in the waterglass takes place in a manner required to obtain a high strength in the hardened material after drying. Boron phosphate is also able to initiate polycondensation of the aqueous urea-formaldehyde solution. Since waterglass and urea-formaldehyde solutions are miscible in any ratio, it is possible to produce a combination product of both components by using boron phosphate as the hardener. This combination has the advantage that it combines the non-inflammability and high strength, accompanied by better adhesion, of the silica with the favorable properties of the urea-formaldehyde condensation products, namely their low thermal conductivity and unit weight and their resistance to cracking caused by shrinkage during drying.

Another advantage of using boron phosphate, is that it forms phosphates with the alkali ions of the waterglass which have an anti-corrosion effect. This effect is of considerable importance to the building industry in the insulation of installation pipes. It is known that the alkali chlorides formed when chlorine-containing hardeners are used have a pronounced corrosive effect.

In one preferred embodiment of the process according to the invention, the effect of the boron phosphate can be considerably enhanced by the addition of a polyhydric alcohol, i.e., a multi-hydroxylated organic substance, for example sugar. In this way, the known increase in the strength of the acid is caused by the formation of a complex boric acid after hydrolysis of the boron phosphate. By using these additives the boron phosphate required can be reduced to about half. Suitable polyhydric alcohols include erythritol, arabitol, xylitol, mannitol, sorbitol and dulcitol, but preferably glycerol or compounds of glycerol. Among the compounds of glycerol, the acetic acid esters, particularly the diacetate, are especially suitable. In their case, the hydrolytic formation of acetic acid is presumably followed by pregelation which, particularly in the case of foams, has a favorable effect upon stabilization of the as yet unhardened material. In the context of the invention, gelatin is a form of solidification of the waterglas which can be eliminated by the addition of water. It is only when the waterglass hardens throughout into polymeric silica that silica bodies which are dimensionally stable with respect to water are formed. The waterglass can also be pregelled by the addition of carboxylic acid esters or standard foam stabilizers, for example by adding the monoethanolamide of coconut oil fatty acid.

In the case of pure silica materials, the boron

In the case of pure silica materials, the boron phosphate is used in a quantity of about 5 to 12% by weight, based on $SiO_2$. In cases where a multi-hydroxylated compound is absent, the preferred minimum quantity in which the boron phosphate uses to around 8% by weight. In the case of urea-formaldehyde products, boron phosphate is used in a quantity of about 3 to 4% by weight, based on the dry polycondensate, whereas in the case of combination materials the quantity is about 10 to 15% by weight, based on the water-insoluble dry fractions. The exact quantity of boron phosphate required depends upon the ratio of the individual components. The multi-hydroxylated compounds are added in quantities of about 8 to 15% by weight in the case of pure silica materials, and in quantities of about 2 to 20% by weight in the case of combination materials, based on the water-insoluble dry fraction. The quantity required depends upon the required hardening time.

The higher quantity of boron phosphate required in the case of combination materials is explained by the neutralizing effect of the alkali in the waterglass because the urea-formaldehyde fraction has to be hardened in the acid range, unlike the case of pure silica materials. If larger quantities of boron phosphate and/or multi-hydroxylated compounds are added, shorter hardening times will result.

The boron phosphate can be produced by mixing finely ground boric acid and 85% phosphoric acid in a stoichiometric excess in accordance with the following reaction: $H_3PO_4 + H_3BO_3 \rightarrow BPO_4 + 3 H_2O$. The product is a pasty mixture. This is dried at 110° C, preferably after adding some material which has already been dried. The dry material is ground and calcined at temperatures of from 150° to 500° C and the product has to be ground very finely to a grain size of about 50% below 60 μm. In the case of a coarser material, locally different solidification stages, which do not guarantee homogeneity, are in danger of being formed in the hardened material. It has proved to be of advantage to add the finely ground boron phosphate in suspension either in water, glycerin or diacetin because this provides for more uniform distribution.

The composition of the boron phosphate can be modified within certain limits. Thus, an excess of phosphoric acid of up to about 10 % of the stoichiometric quantity has no adverse effect if calcination is carried out at an elevated temperature of from 400° to 500° C. Lower temperatures are used with a stoichiometric composition and these generally lead to more active hardeners which result more quickly in polymerization. In this way, the onset of hardening can be varied from a few seconds up to about 1 hour. As already mentioned, relatively slow hardening is of advantage. Subsequent addition of the described stabilizers is then advisable for the production of foams.

Foams can be produced by various methods. Thus, foaming can be carried out in accordance with known methods by blowing in air. This procedure is particularly preferred for continuous foaming in situ. However, batch foaming in gassing vessels can be carried out with equal effect for block foaming.

When foaming is carried out by air injection a surfactant has to be used. In addition to soaps and detergents, saponin, sodium oleate, talloleic acid and alkyl sulfonates have proved to be particularly suitable surfactants.

Foaming can also be carried out by adding expanding agents such as reactive substances which, when mixed with the starting components, give off gases which lead to foam formation. In this case, it is possible to adopt techniques similar to those normally used in the production of lightweight structural elements. Powdered aluminum, zinc, or lead can be used in the foaming of waterglass. The addition of hydrogen peroxide is also effective.

The evaporation of low-boiling additives of the fluorochlorinated hydrocarbon type, such as for example $CFCl_3$ and $CF_2Cl_2$, which is standard practice in the production of hard polyurethane foam by physical expansion, can also be used for foam formation.

Finally, foams can be produced from solid thermoplastic starting products by a third process in which water of hydration or methanol is suddenly evaporated at the output end of extruders which are under pressure and elevated temperature. This technique is adopted in the foaming of hydrated alkali silicates.

Just as foams can be hardened by the process according to the invention, so can the starting materials be hardened in compact form, i.e., without foaming. In this way, it is possible to obtain new plastics systems which are primarily distinguished by better temperature and fire resistance. However, it is also possible to obtain other systems if, for example, the inorganic component predominates.

In particular, the invention relates to foam or compact-material systems containing urea and formaldehyde as the organic starting component and sodium silicate as the inorganic constituent. However, it is also possible in accordance with the invention to produce by solidification from aqueous systems other organic systems such as thiourea-formaldehyde products, or other inorganic materials, such as potassium or lithium silicate or silica itself.

In the case of pure urea-formaldehyde products, it is preferred to start with aqueous solutions of the components in which urea and formaldehyde are mixed in a molar ratio of from 1:1 to 1:3.5. The overall concentration is determined by the formaldehyde solution used which normally has a concentration of from 30 to 40% by weight and in which the corresponding quantity of urea is dissolved. To stabilize the solution, the pH-value is adjusted to pH 7 to 8 by neutralization with a little NaOH, and some methanol is added.

Sodium silicate solutions containing from 25 to 30% by weight of silica are normally used as the starting material for pure silica foams or compact materials. The molar ratio of sodium oxide to silicon dioxide is preferably between 1:3 and 1:4. Larger contents of silica lead to unstable solutions, while lower contents produce an unfavorable increase in the quantities of water-soluble sodium compounds in the end product. If necessary, these constituents can be removed by washing.

The two materials can be combined in any ratio because the starting components can be mixed in any ratio. It is also possible to add fillers, such as pumice stone, expanded clay, perlite, vermiculite or blast-furnace slag. Asbestos, glass fibers or mineral wool, finely ground hydrargillite and calcium sulfate can be added both to increase strength and to improve shrinkage behavior during drying. Organic materials, for example foam granulates, can also be added.

The foams solidified in accordance with the invention are suitable for use, for example, as sound-insulating or heat-insulating materials, especially in the building industry. They can be used with advantage when foaming is carried out in situ, for example for filling wall cavities, installation openings or intermediate floors. However, they are also suitable for use as structural elements in sandwich structures of the kind used in prefabricated house construction.

The compact material systems which can be produced in accordance with the invention can also be used with advantage in the building industry for joining individual structural components or even for producing structural components of this kind. They can also be used as soil-consolidating agents or, when they contain urea, as slow-release nitrogen fertilizers.

The process according to the invention is illustrated by the following Examples.

EXAMPLE 1

100 parts by weight of finely ground boric acid were mixed with 186 parts by weight of 85% phosphoric acid in a forced circulation mixer until a homogeneous paste was formed. After this paste had been dried at 150° C, the dry mass obtained was broken up and ground until a grain size of 90% below 50 μm was obtained.

7.5 parts by weight of this boron phosphate were added with stirring to 275 parts by weight of soda waterglass with an $SiO_2$-content of 28% by weight and an $Na_2O:SiO_2$ ratio of 1:3.5, and the resulting mixture was subsequently introduced into a mold. Hardening began after about 10 minutes. After complete drying, a compact molding with a strength of about 20 kg/cm$^2$ was obtained.

The same quantities indicated above were mixed in the presence of 10 parts by weight of a 50% aqueous solution of paraffin sulfonates with an average chain length of 14 to 15 carbon atoms, and air was stirred in by means of a high-speed dissolver disc. A foam was obtained which occupied 5 to 10 times the original volume, depending upon the quantity of air stirred in. Hardening and drying at room temperature gave a waterproof silica foam with a unit weight of from 0.2 to 0.3 kg/l. The foam had a strength of from 2 to 3 kg/cm$^2$ and a coefficient of thermal conductivity of about 0.05 Kcal/m.h.° C at 20° C.

EXAMPLE 2

10 parts by weight of the 50% paraffin sulfonate solution described in Example 1 were added to 275 parts by weight of soda waterglass with the same composition as in Example 1, followed by the addition, using a high-speed dissolver disc, of 5 parts by weight of boron phosphate suspended in an equivalent quantity of glycerin diacetate. On completion of foaming, the material obtained was introduced into a mold. Hardening began some 6 to 7 minutes after addition of the boron phosphate. After complete drying in air, a foam was obtained which had a unit weight of about 0.2 kg/l and a strength of about 3 kg/cm$^2$.

EXAMPLE 3

5 parts by weight of glycerin diacetate were added to a mixture of 275 parts by weight of waterglass, 35 parts by weight of water and 10 parts by weight of sodium alkyl sulfonate. The resulting mixture was foamed by blowing in air and, finally, a suspension of 4 parts by weight of boron phosphate in 6 parts by weight of glycerin was added. Hardening began after about 4 to 5 minutes. Drying in air gave a foam molding with a density of 0.18 kg/l and a strength of about 5 kg/cm$^2$.

EXAMPLE 4

5 parts by weight of monoethanolamide of coconut oil fatty acid were added to the mixture of Example 3, followed by addition of glycerin triacetate instead of the diacetate in the same quantity. The foam obtained has a unit weight of 0.17 kg/l. After washing with water, followed by drying, the unit weight dropped to 0.085 kg/l due to the absence of the alkali salts which had been dissolved out. The foam had a strength of only about 2 kg/cm$^2$.

EXAMPLE 5

5 parts by weight of glycerin diacetate were added with stirring to 275 parts by weight of waterglass and 20 parts by weight of sodium alkyl sulfonate. The resulting mixture was foamed by blowing air into it and a suspension of 6 parts by weight of boron phosphate in 10 parts by weight of glycerin were added on completion of foaming. Hardening began after about 1 minute. After complete drying, a waterproof foam was obtained which had a unit weight of 0.18 kg/l, a compressive strength of 5 kg/cm$^2$ and a coefficient of thermal conductivity of 0.04 Kcal/m.h.° C. The foam had about 60 to 80% of open pores. In the absence both of sodium alkyl sulfonate and of air, a compact molding is obtained which, after complete drying, had a strength of 10 to 15 kg/cm$^2$.

EXAMPLE 6

100 parts by weight of urea were dissolved with heating in 140 parts by weight of a 35% aqueous formaldehyde solution and the resulting solution was adjusted to pH 7.5. by the addition of 2 parts by weight of 5% by weight sodium hydroxide. 2.5 parts by weight of methyl alcohol were added for stabilization.

1 part by weight of boron phosphate was added with stirring to 50 parts by weight of this solution. Hardening began after 5 minutes, accompanied by the evolution of heat. Polycondensation begins 3 minutes after the addition of 2 parts by weight of boron phosphate and only 1 to 2 minutes after the addition of 3 parts by weight of boron phosphate. Firm, compact moldings were obtained after complete drying and hardening.

EXAMPLE 7

100 parts by weight of urea were dissolved with moderate heating in 280 parts by weight of a 35% by weight aqueous formaldehyde solution. 2.5 parts by weight of 5% by weight sodium hydroxide were added for neutralization and about 3 parts by weight of methyl alcohol for stabilization were also added.

Boron phosphate from Example 1 was added with stirring to 50 parts by weight of this urea-formaldehyde solution. When 1 part by weight of boron phosphate was added, hardening began after about 12 minutes. When 2 parts by weight of boron phosphate were added, hardening began after only 4 minutes, and after only 2 to 3 minutes when 3 parts by weight of boron phosphate were added. Firm moldings were obtained after drying in every case.

EXAMPLE 8

25 parts by weight of sodium alkyl sulfonate were added as in Example 1 to 230 parts by weight of a urea-formaldehyde solution with a molar ratio of urea to formaldehyde of 1:2, which had been prepared in accordance with Example 7, and air was introduced into the resulting mixture using a high-speed dissolver disc. 20 parts by weight of boron phosphate were added when the foam had reached a volume of about 5 to 7 times the original volume of the solution, the mixture was briefly stirred and the foam obtained introduced into a mold. Solidification began after about 5 minutes. A firm foam with a unit weight of 0.19 kg/l was obtained after drying.

EXAMPLE 9

37 parts by weight of waterglass solution from Example 1 were added to 50 parts by weight of a solution of urea and formaldehyde in a molar ratio of 1:1, which had been prepared as described in Example 6. The components were mixed and 10 parts by weight of boron phosphate and 2 parts by weight of glycerin diacetate were added with continued stirring. Hardening began after about 1 minute. A firm, waterproof molding was obtained after complete drying.

EXAMPLE 10

30 parts by weight of waterglass from Example 1 were added to 50 parts by weight of a solution of urea and formaldehyde in a molar ratio of 1:2, which had been prepared as described in Example 7. Hardening began 2 minutes after the addition of 2 parts by weight of glycerin triacetate and 7.5 parts by weight of boron phosphate. 45 parts by weight of waterglass and 10 parts by weight of boron phosphate were added, and hardening begin after about 1 minute. However, when 60 parts by weight of waterglass and 15 parts by weight of boron phosphate were added, hardening began after only about 30 seconds. Firm moldings with different silica contents were obtained after complete drying.

EXAMPLE 11

306 parts by weight of waterglass were added to 230 parts by weight of a urea-formaldehyde solution of the kind described in Example 6, and the mixture was beaten into a foam following the addition of 20 parts by weight of a 50% aqueous solution of sodium alkyl sulfonate. Finally, 30 parts by weight of boron phosphate and 7.5 parts by weight of glycerin diacetate were added, and more air was beaten in for a brief period. The volume of the foam reached about 8 to 10 times the original volume before the addition of the sodium alkyl sulfonate. Hardening began about 10 minutes after the foam had been introduced into a mold. A foam with a unit weight of 0.15 kg/l was obtained after about 2 days' drying in air.

EXAMPLE 12

258 parts by weight of waterglass and 10 parts by weight of the foamer solution were added to 115 parts by weight of a urea-formaldehyde solution which had been prepared as described in Example 7. The mixture was foamed by beating in air and a suspension of 15 parts by weight of boron phosphate in 20 parts by weight of glycerol was added. Hardening began after about 2 minutes. A firm foam with a unit weight of 0.2 kg/l was obtained after drying at room temperature.

EXAMPLE 13

The boron phosphate used in this Example was obtained by mixing 2.1 parts by weight of 85% phosphoric acid with 1 part by weight of boric acid which had been ground to less than 0.1 mm in size in the presence of the returned, already dried boron phosphate powder in a quantity of 30% by weight. The resulting paste was dried at 200° C. The product thus obtained was ground so that 50% by weight had a grain size of less than 60 μm and calcined at 500° C. 53 parts by weight of this boron phosphate were added to a mixture of 275 parts by weight of soda waterglass consisting of 8% by weight of $Na_2O$ and 28% by weight of $SiO_2$, with 15 parts by weight of urea dissolved beforehand in 21 parts by weight of approximately 36% formalin. 10 parts by weight of a 50% aqueous solution of a foamer consisting of a mixture of paraffin sulfonates with average chain lengths of 14 to 15 carbon atoms, had been previously added as foaming agent. 5 parts by weight of coconut oil fatty acid monoethanolamide, emulsified in 5 parts by weight of water, were added to stabilize the foam obtained by beating in air until it hardened about 10 minutes later. After 5 hours, the fine-cell foam with about 8 times the original volume had hardened to such an extent that it could be removed from the mold. A foam with a unit weight of 0.16 kg/l was obtained after drying. By washing with water the unit weight was reduced to 0.11 kg/l.

EXAMPLE 14

This foam was produced in the same way as that described in Example 13, except that 20 parts by weight instead of 10 parts by weight of the foamer were used. The quantity of dried, but non-calcined boron phosphate was reduced to 35 parts by weight. 5 parts by weight of glycerin monoacetate are used as the foam stabilizer. 28 parts by weight of finely ground (80% by weight less than 100 μm) hydrargillite were additionally added. The foam obtained had a unit weight after drying of about 0.2 kg/l and a strength of about 8 kg/cm$^2$.

It will be appreciated that the instant specification and examples are set forth by way of illustration and not limitation, and that various modifications and changes may be made without departing from the spirit and scope of the present invention.

What is claimed is:

1. In the production of foams or compact materials by adding an acidic hardener to an aqueous system containing a resin selected from the group consisting of urea-formaldehyde and thiourea-formaldehyde component capable of being hardened thereby, and allowing said system to set to a hardened mass, the improvement which comprises employing about 3 to 15% by weight of boron phosphate as said hardener.

2. The process of claim 1, wherein a gelling agent is also included in said aqueous system.

3. The process of claim 1, wherein a polyhydric alcohol is also included in said aqueous system.

4. The process of claim 1, wherein the aqueous system further contains an alkali metal silicate.

5. The process of claim 3, wherein the polyhydric alcohol is glycerine and is employed in about 2 to 20% by weight.

6. The process of claim 5, wherein the organic component contained in said aqueous system comprises at least one of urea-formaldehyde and thiourea-formaldehyde, the system further contains an alkali metal silicate, and the boron phosphate is employed in about 10 to 15% by weight.

7. The process of claim 1, including the step of generating a gas within said aqueous system prior to completion of hardening, whereby a foam is produced upon completion of hardening.

8. The process of claim 1, wherein setting is effected at about ambient temperature.

* * * * *